(12) United States Patent
Sprachmann

(10) Patent No.: US 8,772,361 B2
(45) Date of Patent: Jul. 8, 2014

(54) PROCESS FOR PRODUCING A PURIFIED SYNTHESIS GAS STREAM

(75) Inventor: Gerald Sprachmann, Amsterdam (NL)

(73) Assignee: Shell Oil Company, Houston, TX (US)

( * ) Notice: Subject to any disclaimer, the term of this patent is extended or adjusted under 35 U.S.C. 154(b) by 409 days.

(21) Appl. No.: 13/262,109

(22) PCT Filed: Mar. 30, 2010

(86) PCT No.: PCT/EP2010/054228
§ 371 (c)(1),
(2), (4) Date: Nov. 9, 2011

(87) PCT Pub. No.: WO2010/112517
PCT Pub. Date: Oct. 7, 2010

(65) Prior Publication Data
US 2012/0046370 A1 Feb. 23, 2012

(30) Foreign Application Priority Data
Mar. 30, 2009 (EP) .................................... 09156579

(51) Int. Cl.
*C07C 27/00* (2006.01)
*B01J 8/00* (2006.01)
*C01C 3/00* (2006.01)

(52) U.S. Cl.
USPC ...................... 518/700; 423/244.07; 423/236

(58) Field of Classification Search
USPC ............................. 423/236, 244.07; 518/700
See application file for complete search history.

(56) References Cited

U.S. PATENT DOCUMENTS

| | | | |
|---|---|---|---|
| 4,050,909 A | 9/1977 | Ranke | 55/68 |
| 2005/0135983 A1 | 6/2005 | Geosits et al. | 423/242.1 |
| 2007/0072949 A1 | 3/2007 | Ruud et al. | 518/702 |

FOREIGN PATENT DOCUMENTS

| | | | | |
|---|---|---|---|---|
| CN | 101316650 A | 9/2006 | | |
| EP | 0239111 | 9/1987 | ............... | C01B 3/56 |
| EP | 0661373 | 12/1994 | ............... | C10K 1/10 |
| EP | 1918352 | 5/2008 | ............... | C10G 2/00 |
| EP | 1961697 | 8/2008 | | |
| WO | WO2006070018 | 7/2006 | ............... | C10K 3/04 |
| WO | WO2008037728 | 4/2008 | ............... | C01B 3/52 |
| WO | 2008068305 A2 | 6/2008 | | |
| WO | WO2008104058 | 9/2008 | ............... | F23G 5/38 |
| WO | WO2009019497 | 2/2009 | ............... | C10K 1/16 |

OTHER PUBLICATIONS

Van Der Burgt, Maarten; "The shell Middle Distillate Synthesis"; Petroleum Review; pp. 204-209; Apr. 1990.
Henry, Joseph, et al.; "Perry's Chemical Engineers' Handbook"; 7th Edition; Section 22; pp. 1-83; 1997.

*Primary Examiner* — Jafar Parsa

(57) ABSTRACT

A process for producing a purified synthesis gas stream from a feed synthesis gas stream comprising besides the main constituents carbon monoxide and hydrogen also hydrogen sulphide, HCN and/or COS, the process comprising the steps of: (a) contacting one part of the feed synthesis gas stream with a water gas shift catalyst in a shift reactor in the presence of water and/or steam to react at least part of the carbon monoxide to hydrogen and carbon dioxide, to obtain a shifted synthesis gas stream enriched in hydrogen and in carbon dioxide; (b) contacting another part of the feed gas stream with a hydrolysis catalyst in the presence of water to remove HCN and/or COS to obtain a hydrolysed synthesis gas stream depleted in HCN and/or COS; (c) removing $H_2S$ from the shifted synthesis gas stream and from the hydrolysed synthesis gas stream by contacting these gas streams in a $H_2S$-removal zone with an aqueous alkaline washing liquid to obtain a $H_2S$-depleted synthesis gas stream and a sulphide-comprising aqueous stream; (d) contacting the sulphide-comprising aqueous stream with sulphide-oxidizing bacteria in the presence of oxygen in a bioreactor to obtain a sulphur slurry and a regenerated aqueous alkaline washing liquid; (e) removing carbon dioxide from the $H_2S$-depleted synthesis gas stream, to obtain the purified synthesis gas stream.

12 Claims, 1 Drawing Sheet

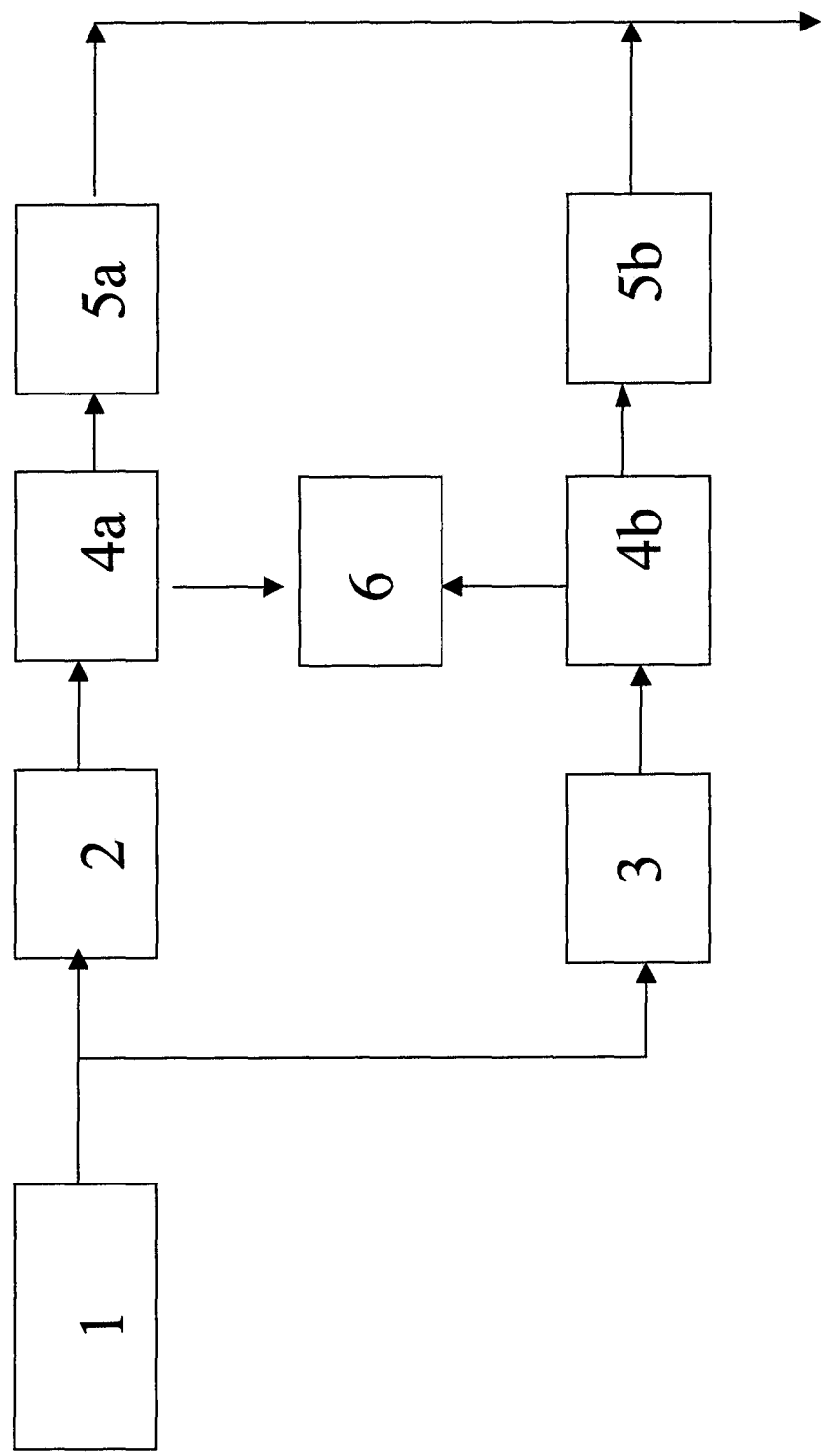

PROCESS FOR PRODUCING A PURIFIED SYNTHESIS GAS STREAM

PRIORITY CLAIM

The present application claims priority from PCT/EP2010/054228, filed 30 Mar. 2010 which claims priority from European Application 09156579.6, filed 30 Mar. 2009.

The present invention relates to a process for producing a purified synthesis gas stream from a feed synthesis gas stream comprising contaminants.

Synthesis gas streams are gaseous streams mainly comprising carbon monoxide and hydrogen. Synthesis gas streams are generally produced via partial oxidation or steam reforming of hydrocarbons including natural gas, coal bed methane, distillate oils and residual oil, and by gasification of solid fossil fuels such as biomass or coal or coke. Reference is made to Maarten van der Burgt et al., in "The Shell Middle Distillate Synthesis Process, Petroleum Review April 1990 pp. 204-209" for a general description on the preparation of synthesis gas.

There are many solid or very heavy (viscous) fossil fuels which may be used as feedstock for generating synthesis gas, including biomass, solid fuels such as anthracite, brown coal, bitumous coal, sub-bitumous coal, lignite, petroleum coke, peat and the like, and heavy residues, e.g. hydrocarbons extracted from tar sands, residues from refineries such as residual oil fractions boiling above 360° C., directly derived from crude oil, or from oil conversion processes such as thermal cracking, catalytic cracking, hydrocracking etc. All such types of fuels have different proportions of carbon and hydrogen, as well as different substances regarded as contaminants.

Depending on the feedstock used to generate synthesis gas, the synthesis gas will contain contaminants such as carbon dioxide, hydrogen sulphide, carbonyl sulphide and carbonyl disulphide while also nitrogen, nitrogen-containing components (e.g. HCN and $NH_3$), metals, metal carbonyls (especially nickel carbonyl and iron carbonyl), and in some cases mercaptans.

Because synthesis gas is generally further processed in catalytic conversion reactions, removal of these contaminants to low levels is often desired to prevent catalyst poisoning. An especially interesting catalytic conversion reaction is a hydrocarbon synthesis process. In a hydrocarbon synthesis process, synthesis gas is catalytically converted into hydrocarbon compounds ranging from methane to high molecular weight molecules comprising up to 200 carbon atoms, or, under particular circumstances, even more.

Processes for producing a purified synthesis gas stream from a feed synthesis gas stream comprising contaminants are known in the art. For example, in U.S. Pat. No. 4,050,909 a synthesis gas purification process is described using cold methanol. This process enables removal of hydrogen sulphide and carbon dioxide, but the concentrations of these contaminants in the purified synthesis gas are still in the ppmv range. For applications where the synthesis gas is to be catalytically converted, contaminant concentrations in the ppmv range are still too high. Purifying the synthesis gas streams to a higher degree using a methanol-based process would be uneconomical due to the disproportionately large amounts of energy required to regenerate the methanol.

It is an object of the present invention to provide an optimised process for purification of a synthesis gas stream derived from a range of carbonaceous fuels, such that the purified synthesis gas is suitable for use in catalytic chemical conversion reactions, for example the Fischer-Tropsch process.

In the case that the synthesis gas is derived via gasification of solid carbonaceous fuels such as biomass or coal, the hydrogen/carbon monoxide ($H_2$/CO) ratio in the synthesis gas formed will generally be less than 1 due to the proportion of carbon and hydrogen in solid carbonaceous fuels. For example, Fischer-Tropsch processes based on cobalt-catalysts generally desire an $H_2$/CO ratio in the synthesis gas in the range of from 1.5 to 2.0, frequently 1.6-1.8. Synthesis gas streams having a higher $H_2$/CO ratio are also desired for other parts or sections of a Fischer-Tropsch plant: some parts may desire a substantially pure hydrogen stream, that is, a very high $H_2$/CO ratio.

It is an additional object of the present invention to provide a process for purification of a synthesis gas stream resulting in an increase in the $H_2$/CO ratio in the purified synthesis gas.

It has now been found that these objects can be achieved by subjecting part of a feed synthesis gas stream comprising contaminants to a water gas shift and removing $H_2S$ directly from the feed synthesis gas stream.

Therefore, the invention provides a process for producing a purified synthesis gas stream from a feed synthesis gas stream comprising besides the main constituents carbon monoxide and hydrogen also hydrogen sulphide, HCN and/or COS, the process comprising the steps of:

(a) contacting one part of the feed synthesis gas stream with a water gas shift catalyst in a shift reactor in the presence of water and/or steam to react at least part of the carbon monoxide to hydrogen and carbon dioxide, to obtain a shifted synthesis gas stream enriched in hydrogen and in carbon dioxide;

(b) contacting another part of the feed gas stream with a hydrolysis catalyst in the presence of water/steam to remove HCN and/or COS to obtain a hydrolysed synthesis gas stream depleted in HCN and/or COS;

(c) removing $H_2S$ from the shifted synthesis gas stream and from the hydrolysed synthesis gas stream by contacting these gas streams in a $H_2S$-removal zone with an aqueous alkaline washing liquid to obtain a $H_2S$-depleted synthesis gas stream and a sulphide-comprising aqueous stream;

(d) contacting the sulphide-comprising aqueous stream with sulphide-oxidizing bacteria in the presence of oxygen in a bioreactor to obtain a sulphur slurry and a regenerated aqueous alkaline washing liquid;

(e) removing carbon dioxide from the $H_2S$-depleted synthesis gas stream, to obtain the purified synthesis gas stream.

The process of the present invention enables removal of hydrogen sulphide, carbonyl sulphide and hydrogen cyanide to low levels. The purified synthesis gas, because of its low level of contaminants, is suitable for use in catalytic processes, preferably selected from the group of Fischer-Tropsch synthesis, methanol synthesis, di-methyl ether synthesis, acetic acid synthesis, ammonia synthesis, methanation to make substitute natural gas (SNG) and processes involving carbonylation or hydroformylation reactions.

In the process, the conditions of each step can be adjusted and optimised independently of the other steps to take into account the composition of the feed synthesis gas stream.

The process is economical because $H_2S$ is removed directly from the synthesis gas stream via conversion into elemental sulphur in a sulphur recovery unit (SRU). The synthesis gas stream exiting the SRU has very low concentrations of $H_2S$, enabling the use of an inexpensive non-selective acid gas removal unit to remove remaining $H_2S$ as well as $CO_2$.

The process of the present invention provides a synthesis gas stream with a $H_2/CO$ ratio more suitable for efficient hydrocarbon synthesis, such as in a Fischer-Tropsch process, as well as being able to accommodate variation in the $H_2/CO$ ratio of synthesis gas formed from different qualities of feedstock fuels. Because only part of the feed synthesis gas stream is subjected to a shift reaction, a smaller shift unit is needed, while the purified synthesis gas stream still has the desired $H_2/CO$ ratio.

It will be understood that the amount and type of contaminants in the feed synthesis gas stream can vary and depends on the amount of these contaminants present in the feedstock used to generate the feed synthesis gas stream.

Generally, the feed synthesis gas stream is obtained by gasification or reforming or autothermal reforming of feedstock.

When using solid fossil fuels such as biomass or coal as feedstock, generally the amount of $H_2S$ and COS in the synthesis gas stream leaving the gasifier is below 15 volume %, typically below 5 volume % based on the synthesis gas stream.

When using an oil residue as feedstock, generally the amount of $H_2S$ and COS in the synthesis gas stream leaving the gasifier will be below 20 volume %, typically below 10 volume % based on the synthesis gas stream.

The synthesis gas stream generated from a feedstock may comprise particulate matter, for example soot particles. Therefore, in a preferred embodiment synthesis gas exiting a synthesis gas generation unit is contacted with scrubbing liquid in a soot scrubber to remove particulate matter, in particular soot, thereby obtaining the feed synthesis gas stream. The synthesis gas stream exiting the synthesis gas generating unit is generally at elevated temperature and/or elevated pressure. Especially in the event that the synthesis gas is generated in a gasifier, the synthesis gas stream exiting the gasifier will be at elevated temperature and at elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 40 to 160° C., more preferably from 110 to 150° C. Preferably, the pressure at which the synthesis gas stream is contacted with scrubbing liquid is in the range of from 20 to 80 bara, more preferably from 20 to 60 bara.

The amount of COS in the feed synthesis gas stream depends on the composition of the feedstock from which the synthesis gas is derived and the technology applied for the production of synthesis gas. Generally, the amount of COS in a feed synthesis gas stream derived from solid fossil fuel feedstocks, especially coal, is from about 100 to 3000 ppmv, based on the feed synthesis gas stream. For biomass, the amount of COS is generally in the range of from 1 to 100 ppmv.

In step (a), one part of the feed synthesis gas stream is contacted with a water gas shift catalyst to react at least part of the carbon monoxide with water/steam. The water shift conversion reaction is well known in the art. Generally, water, usually in the form of steam, is mixed with the part of the feed synthesis gas stream to form carbon dioxide and hydrogen. The catalyst used can be any of the known catalysts for such a reaction, including iron, chromium, copper and zinc. Copper on zinc oxide is a known shift catalyst.

In step (a), carbon monoxide is converted to carbon dioxide and thus, the $H_2/CO$ ratio is increased. The $H_2/CO$ ratio in synthesis gas formed by gasification of most types of carbonaceous fuels is generally about or less than 1, and is commonly about 0.3-0.6 for coal-derived synthesis gas, and 0.5-0.9 for heavy residue-derived synthesis gas. It is possible to use such an $H_2/CO$ ratio in a Fischer-Tropsch process, but more satisfactory results can be achieved by increasing the $H_2/CO$ ratio. The shifted gas stream obtained in step (a) is enriched, often highly enriched, in hydrogen and in carbon dioxide. The shifted gas stream obtained in step (a) suitably has an $H_2/CO$ ratio above 3, preferably above 5, more preferably above 7, still more preferably above 15 and possibly 20 or even above.

In a preferred embodiment of step (a), carbon monoxide in the feed synthesis gas stream is converted with a low amount of steam in the presence of a catalyst as present in one or more fixed bed reactors. A series of shift reactors may be used wherein in each reactor a water gas shift conversion step is performed. The content of carbon monoxide, on a dry basis, in the feed synthesis gas stream as supplied to the first or only water gas shift reactor is preferably at least 50 vol. %, more preferably between 55 and 70 vol. %. The feed synthesis gas stream preferably contains hydrogen sulphide in order to keep the catalyst sulphided and active. The minimum content of hydrogen sulphide will depend on the operating temperature of the shift reactor, on the space velocity (GHSV) and on the sulphur species present in the feed synthesis gas stream. Preferably at least 300 ppm $H_2S$ is present in the feed synthesis gas stream. There is no limitation on the maximum amount of $H_2S$ from a catalyst activity point of view.

In the preferred embodiment of step (a), the steam to carbon monoxide molar ratio in the feed synthesis gas stream as it enters the first or only water gas shift reactor is preferably between 0.2:1 and 0.9:1. The temperature of the feed synthesis gas stream as it enters the shift reactor is preferably between 190 and 230° C. In addition it is preferred that the inlet temperature is between 10 and 60° C. above the dewpoint of the feed to each water gas shift conversion step. The space velocity in the reactor is preferably between 6000-9000 $h^{-1}$. The pressure is preferably between 2 and 5 MPa and more preferably between 3 and 4.5 MPa.

The conversion of carbon monoxide may generally not be 100% because of the sub-stoichiometric amount of steam present in the feed of the reactor. In a preferred embodiment the content of carbon monoxide in the shift reactor effluent, using a fixed bed reactor, will be between 35 and 50 vol. % on a dry basis, when starting from a feed synthesis gas stream comprising between 55 and 70 vol. % carbon monoxide, on a dry basis, and a steam/CO ratio of 0.2 to 0.3 molar. If a further conversion of carbon monoxide is desired it is preferred to subject the shift reactor effluent to a next water gas shift conversion step.

The preferred steam to carbon monoxide molar ratio, inlet temperature and space velocity for such subsequent water gas shift conversion steps is as described for the first water gas shift conversion step. As described above the feed synthesis gas stream is suitably obtained from a gasification process and is suitably subjected to a water scrubbing step. In such a step water will evaporate and end up in the syngas mixture. The resultant steam to CO molar ratio in such a scrubbed syngas will suitably be within the preferred ranges as described above. This will result in that no steam or water needs to be added to the syngas as it is fed to the first water gas shift conversion step. In order to achieve the desired steam to CO molar ranges for the subsequent steps steam or boiler feed water will have to be added to the effluent of each previous step.

The water gas shift step may be repeated to stepwise lower the carbon monoxide content in the shift reactor effluent of each next shift reactor to a CO content, on a dry basis, of below 5 vol. %. It has been found that in 4 to 5 steps, or said otherwise, in 4 to 5 reactors such a CO conversion can be achieved.

It has been found that it is important to control the temperature rise in each shift reactor. It is preferred to operate each shift reactor such that the maximum temperature in the catalyst bed in a single reactor does not exceed 440° C. and more preferably does not exceed 400° C. At higher temperatures the exothermal methanation reaction can take place, resulting in an uncontrolled temperature rise.

The catalyst used in step (a) is preferably a water gas shift catalyst, which is active at the preferred low steam to CO molar ratio and active at the relatively low inlet temperature without favouring side reactions such as methanation. Suitably the catalyst comprises a carrier and the oxides or sulphides of molybdenum (Mo), more preferably a mixture of the oxides or sulphides of molybdenum (Mo) and cobalt (Co) and even more preferably also comprising copper (Cu) tungsten (W) and/or nickel (Ni). The catalyst suitably also comprises one or more promoters/inhibitors such as potassium (K), lanthanum (La), manganese (Mn), cerium (Ce) and/or zirconium (Zr). The carrier may be a refractory material such as for example alumina, $MgAl_2O_4$ or $MgO—Al_2O_3-TiO_2$.

An example of a suitable catalyst comprises an active γ-$Al_2O_3$ carrier and between 1-8 wt % CoO and between 6-10 wt % $MoO_3$. The catalyst is preferably present as an extrudate.

In a preferred embodiment of step (a), the feed synthesis gas stream comprises at least 50 vol. % of carbon monoxide, and the steam to carbon monoxide molar ratio in the feed synthesis gas stream as it enters the shift reactor or reactors is preferably between 0.2:1 and 0.9:1 and the temperature of the feed synthesis gas stream as it enters the shift reactor or reactors is between 190 and 230° C.

An additional reaction taking place in step (a), is the conversion of hydrogen cyanide to ammonia. Thus, the shifted gas stream obtained in step (a) will be depleted in hydrogen cyanide.

In step (b) of the process according to the invention, HCN and optionally COS and/or $CS_2$ are removed from another part of the feed synthesis gas stream by contacting this part of the feed synthesis gas stream with a hydrolysis catalyst to obtain a hydrolysed synthesis gas stream.

HCN and/or COS and/or $CS_2$ are converted according to the following reactions:

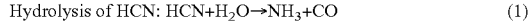

Hydrolysis of HCN: $HCN+H_2O \rightarrow NH_3+CO$ (1)

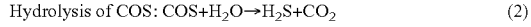

Hydrolysis of COS: $COS+H_2O \rightarrow H_2S+CO_2$ (2)

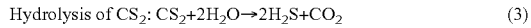

Hydrolysis of $CS_2$: $CS_2+2H_2O \rightarrow 2H_2S+CO_2$ (3)

The amount of water/steam is preferably between 5 v/v % and 80 v/v %. Preferably, the amount of water/steam added is such that the water/steam content of the first gas stream is between 5 v/v % and 80 v/v %, preferably between 10 v/v % and 70 v/v %, more preferably between 15 v/v % and 50 v/v %, based on steam. Typically, the reaction conditions are selected in such a way, that the reaction mixture remains below the dewpoint of $H_2O$.

Step (b) can suitably be performed in a gas/solid contactor, preferably a fixed bed reactor. Catalysts for the hydrolysis of HCN and optionally COS and/or $CS_2$ are known to those skilled in the art and include for example $TiO_2$-based catalysts or catalysts based on alumina and/or chromium-oxide. Preferred catalysts are $TiO_2$-based catalysts.

In step (c), the shifted synthesis gas stream and the hydrolysed synthesis gas stream are contacted with aqueous alkaline washing liquid to transfer hydrogen sulphide from the two synthesis gas streams to the aqueous alkaline washing liquid.

Suitable aqueous alkaline washing liquids include aqueous hydroxide solutions, e.g. sodium hydroxide or potassium hydroxide solutions in water and aqueous (bi)carbonate solutions.

Suitably, step (c) is performed at a temperature in the range of from 5 to 70° C., more preferably from 10 to 50° C. Preferably, step (c) is performed at a pressure in the range of from 1 to 100 bar (g), more preferably from 1.5 to 80 bar (g).

Optionally, the washing liquid is buffered. Preferred buffering compounds are carbonates, bicarbonates phosphates and mixtures thereof, especially sodium carbonate and/or sodium bicarbonate.

The concentration of the buffering compounds depends inter alia on the composition of the gas flow and is generally adjusted in such a way, that the washing liquid is kept within the preferred pH range.

Preferably, the pH of the washing liquid is in the range of from 4.5 to 10, more preferably from 5.5 to 9.0.

In step (d) hydrogen sulphide in the scrubbing medium is converted to elemental sulphur using sulphide-oxidising bacteria in the presence of oxygen in a bioreactor.

Reference herein to sulphide-oxidising bacteria is to bacteria which can oxidise sulphide to elemental sulphur. Suitable sulphide-oxidising bacteria can be selected for instance from the known autotropic aerobic cultures of the genera *Thiobacillus* and *Thiomicrospira*.

The main reactions that can take place in the bioreactor are the microbiological formation of sulphur and sulphate:

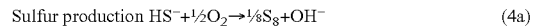

Sulfur production $HS^- + \frac{1}{2}O_2 \rightarrow \frac{1}{8}S_8 + OH^-$ (4a)

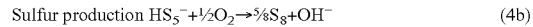

Sulfur production $HS_5^- + \frac{1}{2}O_2 \rightarrow \frac{5}{8}S_8 + OH^-$ (4b)

Sulphate production $HS^- + 2O_2 + OH^- \rightarrow SO_4^{2-} + H_2O$ (5)

The sulphur slurry may comprise one or more products of the main reactions, including elemental sulphur and sulphates.

The regenerated aqueous alkaline washing liquid may comprise sulphur particles.

Reference herein to sulphide-oxidising bacteria is to bacteria which can oxidise sulphide to elemental sulphur. Suitable sulphide-oxidising bacteria can be selected for instance from the known autotropic aerobic cultures of the genera *Thiobacillus* and *Thiomicrospira*.

Preferably, the reaction medium in the bioreactor is buffered. The buffering compounds are chosen in such a way that they are tolerated by the bacteria present in the oxidation reactor. Preferred buffering compounds are carbonates, bicarbonates phosphates and mixtures thereof, especially sodium carbonate and/or sodium bicarbonate. The concentration of the buffering compounds depends inter alia on the composition of the gas flow and is generally adjusted in such a way, that the pH of the reaction medium in the oxidation reactor is between 6.0 and 12.0, preferably between 7.0 and 11.0, more preferably between 8.0 and 10.0.

Typical pressures in the bioreactor are between 0.5 and 2 bar (g).

Preferably, at least part of the aqueous sulphur slurry obtained in step (d) is separated from the regenerated aqueous alkaline washing liquid. Suitably, the separating step takes place in a solid/liquid separator. Suitable solid/liquid separators are described in Perry's Chemical Engineers' Handbook, 7th edition, section 22 (1997).

The sulphur content of the separated aqueous sulphur slurry is suitably between 5 w/w % and 50 w/w %, based on the slurry. Typically, the water of the sulphur slurry is removed to an extent that a sulphur cake with a dry solids content of between 55 and 70% is obtained. Suitably, the sulphur purity of the sulphur cake is between 90 and 98 w/w %, based on the dry weight of the sulphur cake. Optionally, the sulphur slurry can be re-slurried, filtered and dried to obtain a sulphur paste with a purity of at least 95 wt % sulphur, preferably at least 99 wt % sulphur. The sulphur paste thus-obtained can optionally be dried to produce a powder with a dry weight content of at least 85%, preferably at least 90%. This powder can suitably be applied as a fungicide, a fertilizer or as a miticide.

The present invention allows for the division of the feed synthesis gas stream into any number of streams, more than one of which could undergo a catalytic water shift conversion reaction. In the simplest arrangement, as set out in claim 1, the feed synthesis gas stream is divided into two sub-streams, one of which undergoes the conversion reaction. It is preferred that the shifted synthesis gas stream is eventually combined with the non-shifted synthesis gas stream to form a synthesis gas stream having an increased $H_2/CO$ ratio of between 1.1 and 5, preferably between 1.1. and 2.2.

Combining the shifted and the non-shifted synthesis gas streams may take place at several points in the overall process. For example, the shifted and the non-shifted synthesis gas streams may be combined prior to step (c), prior to step (e) or following step (e).

In a preferred embodiment, the shifted and the non-shifted synthesis gas streams are combined following step (e). In this embodiment, step (c) takes place in separate $H_2S$ removal zones for the shifted and the non-shifted synthesis gas streams and step (e) takes place in separate $CO_2$ removal zones. The $H_2S$-depleted and $CO_2$-depleted shifted and non-shifted synthesis gas stream are combined following to step (e).

It will be understood that the invention includes embodiments wherein the feed synthesis gas stream is divided into several sub-streams such so as to create any desired $H_2/CO$ ratio following their recombination. Any degree or amount of division of the feed synthesis gas stream is possible. Where the feed synthesis gas stream is divided into two sub-streams, the division into the sub-streams is preferably in the range of 80:20 to 20:80 by volume, more preferably 70:30 to 30:70 by volume, depending upon the desired final $H_2/CO$ ratio. Simple analysis of the $H_2/CO$ ratios in the feed synthesis gas stream and knowledge of the desired ratio in the combined synthesis gas stream allows easy calculation of the division. In the case that one stream is to be used as feed for e.g. the second stage of a Fischer-Tropsch process, this stream will usually be between 10 and 50%, preferably between 20 and 35% of the stream which is catalytically shifted. In that case there are three streams, the two main streams in the range 80:20 to 20:80 by volume and one stream 10 to 50% of one of the earlier two streams.

The simple ability to change the degree of division of the feed synthesis gas stream into the sub-streams also provides a simple but effective means of accommodating variation in the $H_2/CO$ ratio in the feed synthesis gas stream, primarily due to variation in feedstock quality, i.e. the hydrogen and carbon content of the original fuel, for example, the 'grade' of coal or biomass. Certain grades of biomass or coal generally have a higher carbon content, but a high carbon content will, after gasification of the biomass or coal, provide a greater production of carbon monoxide, and thus a lower $H_2/CO$ ratio. However, using other grades of biomass or coal means removing more contaminants or unwanted parts of the biomass or coal, such as ash and sulphur and sulphur-based compounds. It is observed that it is also possible to divide the feed synthesis gas stream into two streams, followed by a catalytic shift of one of the streams, followed by further division of the shifted stream, e.g. one for combining with the other stream, one for use as additional feed in a second stage of a Fischer-Tropsch process and one for the preparation of hydrogen.

The ability to change the degree of division of the feed synthesis gas stream into the sub-streams allows the present invention to be used with a variety of fuel feedstocks, generally 'raw' biomass or coal, without any significant re-engineering of the process or equipment to accommodate expected or unexpected variation in such feedstocks. Thus, the present invention provides a method of increasing the hydrogen/carbon monoxide ($H_2/CO$) ratio in a synthesis gas stream derived from a solid carbonaceous fuel including biomass or coal, brown coal, peat, and heavy residual oil fractions, preferably biomass or coal.

In step (c), a shifted and a non-shifted synthesis gas stream are produced. In step (e) carbon dioxide is removed from the shifted synthesis gas stream and from the non-shifted synthesis gas stream.

In a first embodiment of step (e), carbon dioxide is removed by contacting the shifted synthesis gas stream and the non-shifted synthesis gas stream with absorbing liquid to remove carbon dioxide and remaining hydrogen sulphide.

Suitable absorbing liquids may comprise chemical solvents or physical solvents or mixtures thereof.

A preferred absorbing liquid comprises a chemical solvent and/or a physical solvent, suitably as an aqueous solution.

Suitable chemical solvents are primary, secondary and/or tertiary amines, including sterically hindered amines.

A preferred chemical solvent comprises a secondary or tertiary amine, preferably an amine compound derived from ethanolamine, more especially DIPA, DEA, MMEA (monomethyl-ethanolamine), MDEA (methyldiethanolamine) TEA (triethanolamine), or DEMEA (diethylmonoethanolamine), preferably DIPA or MDEA. It is believed that these chemical solvents react with acidic compounds such as $H_2S$.

In a second embodiment of step (e), carbon dioxide is removed using a membrane.

It is advantageous to use membranes with a high selectivity for carbon dioxide. The selectivity is defined as the ratio of the carbon dioxide permeability over the permeability of carbon monoxide and hydrogen as measured in single gas experiments. Preferably, the selectivity of the membrane is between 10 and 200, preferably between 20 and 150.

Suitably the membrane material is chosen from the group of polyethylene oxide based materials, preferably polyethylene oxide based material comprising block-copolymers, especially PEO 600/5000 T6T6T or a cross linked PEO, polyimide or polyaramide based materials, cellulose acetate based materials, zeolite based materials, preferably silica-alumina phosphate based materials, more preferably SAPO-34, micro-porous silica materials and carbon molecular sieves materials.

In a third embodiment of step (e), carbon dioxide is removed by cooling the gas streams to a temperature at which carbon dioxide will separate from the gas streams. Suitably, the gas streams are cooled to a temperature at which the carbon dioxide becomes liquid or solid so that it can be separated from the gas streams. The purified synthesis gas obtained in step (d) has low levels of contaminants, suitably in the ppmv or even in the ppbv range. The purified synthesis gas is suitable for use in catalytic reactions or for power generation. For some catalytic reactions, in particular for a Fischer-Tropsch reaction using a cobalt catalyst, further removal of contaminants to levels below 20 or even below 10 ppbv is required. In a special preferred embodiment, the process comprises steps to further purify the purified synthesis gas to obtain further purified synthesis gas.

Thus, preferably the process further comprises step (f), wherein the purified synthesis gas stream obtained in step (e) is contacted with a first solid adsorbent comprising sulphur-impregnated activated carbon and/or activated carbon. In this step, metals and/or metal carbonyls are removed.

Suitably, step (f) is performed at a pressure in the range of from 1 to 80 bara, preferably from 15 to 70 bara, more preferably from 20 to 60 bara.

Suitably, step (f) is performed at relatively low temperature, preferably in the range of from 10 to 150° C., more preferably from 10 to 100° C., still more preferably from 20 to 50° C. At these preferred temperature ranges, the adsorption capacity of the sulphur-impregnated activated carbon and/or activated carbon is higher, especially for nickel carbonyl.

Step (f) results in first solid adsorbent enriched in metals and/or metal carbonyls and a synthesis gas stream depleted in metals and/or metal carbonyls.

In step (f) a synthesis gas stream depleted in metals and/or metal carbonyl compounds is obtained. Suitably, the synthesis gas stream obtained in step (f) comprises less than 1 ppmv of metal carbonyls, preferably less than 10 ppbv of metal carbonyls, based on the total synthesis gas stream.

Preferably, the process further comprises step (g), wherein the synthesis gas stream depleted in metals and/or in metal carbonyl compounds is contacted with a second solid adsorbent. The second solid adsorbent comprises one or more metals or oxides of metals or combinations thereof, the metals preferably being selected from the group of Ag, Sn, Mo, Fe and Zn. An especially preferred solid adsorbent is ZnO, because of its good performance. Another important advantage of ZnO is that the occurrence of unwanted side reactions such as water gas shift, hydrogenation of CO and $CO_2$ and methanol synthesis is much less.

Step (g) is performed at elevated temperature. Preferably, step (e) is performed at a temperature in the range of from 100 to 240° C., more preferably from 140° C. to 200° C. It has been found that at the preferred temperatures, removal of both $H_2S$ and COS to low levels, even in the ppbv range, can be achieved.

Step (g) is performed at a pressure in the range of from 1 to 100 bara, preferably from 20 to 80 bara, more preferably from 40 to 60 bara. By performing step (h) at elevated pressure, the purified synthesis gas stream will be at elevated pressure and can be further processed in a reaction which requires elevated pressure.

The further purified synthesis gas stream obtained in step (g) comprises predominantly hydrogen and carbon monoxide and very low levels, in the ppbv range, of $H_2S$, COS and HCN.

Suitably, the amount of $H_2S$ in the further purified synthesis gas stream is 10 ppbv or less, preferably 5 ppbv or less, more preferably 1 ppbv, based on the purified synthesis. Suitably, the further purified synthesis gas stream comprises an amount of COS of 10 ppbv or less. In most cases the amount of COS in the further purified synthesis gas stream is 5 ppbv or less, or even 1 ppbv or less, based on the further purified synthesis gas stream.

Because of these low concentrations of contaminants, the further purified synthesis gas stream is especially suitable for use in catalytic processes, including a Fischer-Tropsch synthesis process, a methanol synthesis process, a di-methyl ether synthesis process, an acetic acid synthesis process, an ammonia synthesis process, a methanation process to make substitute natural gas (SNG) or to other processes which use a synthesis gas mixture as feed such as for example processes involving carbonylation and hydroformylation reactions.

In a preferred embodiment, the further purified synthesis gas stream is used in a Fischer-Tropsch hydrocarbon synthesis step. In this embodiment, the further purified synthesis gas is contacted with a suitable hydrocarbon synthesis catalyst to form normally liquid hydrocarbons in a hydrocarbon synthesis reaction. Catalysts for use in the Fischer Tropsch reaction frequently comprise, as the catalytically active component, a metal from Group VIII of the Periodic Table of Elements. Particular catalytically active metals include ruthenium, iron, cobalt and nickel. Cobalt is a preferred catalytically active metal.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

It is an advantage of the process according to the invention that step (h) can be performed in similar temperature ranges as the Fischer-Tropsch process. This enables a more efficient overall process, as the temperature fluctuations in the overall process are smaller. This reduces the need for cooling and subsequent heating in between the different process steps.

In a preferred embodiment, a portion of the shifted synthesis gas stream, optionally after removal of contaminants, is used for hydrogen manufacture, such as in a Pressure Swing Adsorption (PSA) step. The proportion of the shifted synthesis gas stream used for hydrogen manufacture will generally be less than 15% by volume, preferably approximately 1-10% by volume. The hydrogen manufactured in this way can then be used as the hydrogen source in hydrocracking of the products of the hydrocarbon synthesis reaction. This arrangement reduces or even eliminates the need for a separate source of hydrogen, e.g. from an external supply, which is otherwise commonly used where available. Thus, the carbonaceous fuel feedstock is able to provide a further reactant required in the overall process of biomass or coal to liquid products conversion, increasing the self-sufficiency of the overall process.

Without wishing to be restricted to a particular embodiment, the invention will now be described in further detail with reference to FIG. 1. In FIG. 1, there is shown a process for producing a purified synthesis gas stream. This starts with the gasification of biomass or coal with oxygen in a gasification unit 1 to form a feed synthesis gas stream comprising hydrogen sulphide, HCN and/or COS. Preferably, removal of solids such as slag, soot and the like is done in a solids removal unit (not shown). The resulting feed synthesis gas stream is then divided into two streams. One stream is led to a shift unit 2, where it is contacted with a shift catalysis, converting CO to $CO_2$ and hydrolysing HCN and COS. The other stream forms a 'by-pass' stream, which passes through a HCN/COS removal system 3. The resulting shifted and non-shifted synthesis gas streams depleted in HCN and COS emanating from units 2 and 3 are led to $H_2S$-removal zones 4a and 4b, where $H_2S$ is removed by contacting the 2 synthesis gas streams with an aqueous alkaline washing liquid. The resulting synthesis gas streams depleted in $H_2S$ are led from $H_2S$-removal zones 4a and 4b to acid gas removal units 5a and 5b, where they are contacted with absorbing liquid to remove $CO_2$ and remaining $H_2S$. This results in purified synthesis gas streams, which are led from units 5a and 5b and combined. The combined purified synthesis gas stream can optionally be led to a sequence of guard beds (not shown) for further removal of contaminants to even lower levels. Aqueous alkaline washing liquid comprising $H_2S$ is led from the $H_2S$ removal zones to bioreactor 6, where $H_2S$ is converted to elemental sulphur.

What is claimed is:

1. A process for producing a purified synthesis gas stream from a feed synthesis gas stream, wherein the feed synthesis gas stream comprises carbon monoxide, hydrogen, hydrogen sulphide, and at least one of HCN or COS, the process comprising the steps of:
   (a) contacting one part of the feed synthesis gas stream with a water gas shift catalyst in a shift reactor in the presence of water and/or steam to react at least part of the carbon monoxide to hydrogen and carbon dioxide, to obtain a shifted synthesis gas stream enriched in hydrogen and in carbon dioxide;
   (b) contacting another part of the feed gas stream with a hydrolysis catalyst in the presence of water to remove the at least one of HCN or COS to obtain a hydrolysed synthesis gas stream depleted in HCN or COS;
   (c) removing $H_2S$ from the shifted synthesis gas stream and from the hydrolysed synthesis gas stream by contacting these gas streams in a $H_2S$-removal zone with an aqueous alkaline washing liquid to obtain a $H_2S$-depleted synthesis gas stream and a sulphide-comprising aqueous stream;
   (d) contacting the sulphide-comprising aqueous stream with sulphide-oxidizing bacteria in the presence of oxygen in a bioreactor to obtain a sulphur slurry and a regenerated aqueous alkaline washing liquid; and
   (e) removing carbon dioxide from the $H_2S$-depleted synthesis gas stream, to obtain the purified synthesis gas stream.

2. A process according to claim 1, wherein step (c) takes place in at least two separate $H_2S$-removal zones, wherein the shifted synthesis gas is led to one $H_2S$-removal zone and the hydrolysed synthesis gas is led to another $H_2S$-removal zone.

3. A process according to claim 1, wherein step (e) takes place in at least two carbon dioxide removal units, wherein the shifted synthesis gas depleted in hydrogen sulphide is led to one carbon dioxide removal unit and the synthesis gas stream depleted in hydrogen sulphide is led to another carbon dioxide removal unit.

4. A process according to claim 1, wherein the water/steam to carbon monoxide molar ratio in the water/steam feed synthesis gas stream entering the shift reactor is in the range of from 0.2:1 to 0.9:1 and wherein the temperature of feed synthesis gas stream entering the shift reactor is in the range of from 190 to 230° C. and wherein the feed synthesis gas stream comprises at least 50 volume % of carbon monoxide, on a dry basis.

5. A process according to claim 1, wherein the sulphide-oxidising bacteria are selected from the group of autotropic aerobic cultures consisting of the genera *Thiobacillus* and *Thiomicrospira*.

6. A process according to claim 1, further comprising the steps of:
   (f) contacting the purified synthesis gas stream with a first solid adsorbent comprising sulphur-impregnated activated carbon and/or activated carbon to remove metals and/or metal carbonyl compounds to obtain a synthesis gas stream depleted in metals and/or metal carbonyl compounds; and
   (g) contacting the synthesis gas stream depleted in metals and/or metal carbonyl compounds in the presence of water with a second solid adsorbent comprising one or more metals or oxides of the metals or combinations thereof, wherein the metals are selected from the group of Ag, Sn, Mo, Fe and Zn at elevated temperature to obtain further purified synthesis gas stream.

7. A process according to claim 6, wherein step (f) is performed at a temperature in the range of from 100 to 240° C.

8. A process according to claim 6, wherein the solid adsorbent comprises zinc oxide.

9. A process according to claim 1, wherein in step (e) carbon dioxide is removed by contacting the shifted synthesis gas stream depleted in hydrogen sulphide and the non-shifted synthesis gas stream depleted in hydrogen sulphide with an absorbing liquid at low temperature and at elevated pressure, thereby transferring carbon dioxide from the gas streams to the absorbing liquid to obtain absorbing liquid enriched in carbon dioxide and the purified gas stream.

10. A process according to claim 1, wherein in step (e) carbon dioxide is removed using a membrane.

11. A process according to claim 1, wherein in step (e) carbon dioxide is removed by cooling the shifted synthesis gas stream depleted in hydrogen sulphide and the non-shifted synthesis gas stream depleted in hydrogen sulphide to a temperature at which carbon dioxide will separate from the gas streams.

12. A process according to claim 1, wherein the further purified synthesis gas is used in catalytic processes selected from the group consisting of Fischer-Tropsch synthesis, methanol synthesis, di-methyl ether synthesis, acetic acid synthesis, ammonia synthesis, methanation to make substitute natural gas (SNG) and processes involving carbonylation or hydroformylation reactions.

\* \* \* \* \*